July 4, 1944.  B. W. WILLIAMS ET AL  2,352,875
CARDIOMETRIC APPARATUS
Filed July 14, 1941   3 Sheets-Sheet 1

Inventors,
Bradlee W. Williams
Homer S. Williams

INVENTOR.
Bradlee W. Williams
Homer S. Williams

Patented July 4, 1944

2,352,875

UNITED STATES PATENT OFFICE 2,352,875

CARDIOMETRIC APPARATUS

Bradlee W. Williams and Homer S. Williams, Chicago, Ill., assignors to Tech Equipment Company, Chicago, Ill.

Application July 14, 1941, Serial No. 402,360

21 Claims. (Cl. 128—2.05)

This invention pertains to cardiometric apparatus and more particularly to apparatus for measurement of blood pressure or arterial tension, but discloses features of novelty useful in the detection and measurement of pulsatory phenomena in connection with fluid pressure systems generally, and it is therefore to be understood that the disclosures are not intended to be limited to the exemplary application alone.

One of the principal objects of the invention is the provision of an apparatus especially adapted for coin-controlled operation in the hands of the layman, whereby both the systolic and diastolic blood pressure may be conveniently ascertained and manifested by mechanism which acts entirely automatically, and which is of relatively simple and rugged construction.

Another object is to provide an apparatus of the class described which will ascertain the diastolic blood pressure by utilization of pressure-sensitive means which begins operation from a sub-diastolic pressure level and increases an extraneous pressure applied to an artery under test by a succession of measured increments, and gives either a transitory or permanent indication of the diastolic pressure when reached.

A further object is to provide means for automatically testing by control of arterial pulses to determine when the true diastolic level is reached.

Another object is to provide means for automatically continuing the pressure application above the diastolic level, when the latter has been reached as aforesaid, until the systolic level is reached, with the further provision of means for indicating the value of the pressure at said systolic level, once reached, and for testing to determine the accuracy of the pressure thus ascertained and indicated.

Further objects are to provide a simple and convenient means in the nature of a single tourniquet for applying a testing pressure and detecting arterial pulses for use in verifying the results of the test; to provide means capable of utilizing either a single pressure indicator or manometer for both systolic and diastolic pressure readings or dual indicating means for said pressures; to provide a simplified testing means utilizing a succession of timed arterial pulsations for determining or controlling the accuracy of the operation of the apparatus; and further, to provide a novel timing means for use in conjunction with the aforesaid testing means; together with means for automatically stopping the machine should the wrist be removed from the tourniquet before completion of its operation.

Other objects, advantages, and novel aspects of the invention reside in certain details of the construction and function and organization of the component parts of the combination hereinafter described and shown in the preferred embodiment set forth in the annexed drawings in which:

In ascertaining blood pressures by application of extraneous pressure to an artery, it is usually necessary to raise the applied pressure to a value above the expected systolic pressure of the individual under test, so as to collapse the artery and occlude the blood flow, and thereafter reduce the applied pressure until the resumption of flow is detected by some means, as in the auricular method by use of a stethoscope applied adjacent the artery to detect the sound of the blood flow against the applied pressure.

Another method contemplates a gradual increase in pressure to the occluding pressure as determined auricularly by the momentary or sustained absence of pulsations indicating complete, partial, or sub-occluding pressures, depending upon the sounds heard.

The present invention provides mechanism for automatically applying a pressure which is below the diastolic range for the average individual and gradually increasing that pressure, first to the diastolic level, and then to the systolic level, and for determining the diastolic pressure by the presence of arterial pulses, and the systolic pressure by the absence of such pulses.

Relatively great accuracy in ascertaining arterial tensions is made possible by the use of the disclosed method in conjunction with the testing means utilized, one of the particular advantages being an increase in the margin of accuracy under variable conditions such as the strength of individual pulses, physical structure of the individual as relates to the ease or difficulty with which his pulse may be detected, his disposition toward involuntary nervous reactions and movements, and analogous factors having a bearing on the operation of an automatic apparatus of this class which may be used especially by the unskilled.

Figures 1, 2:
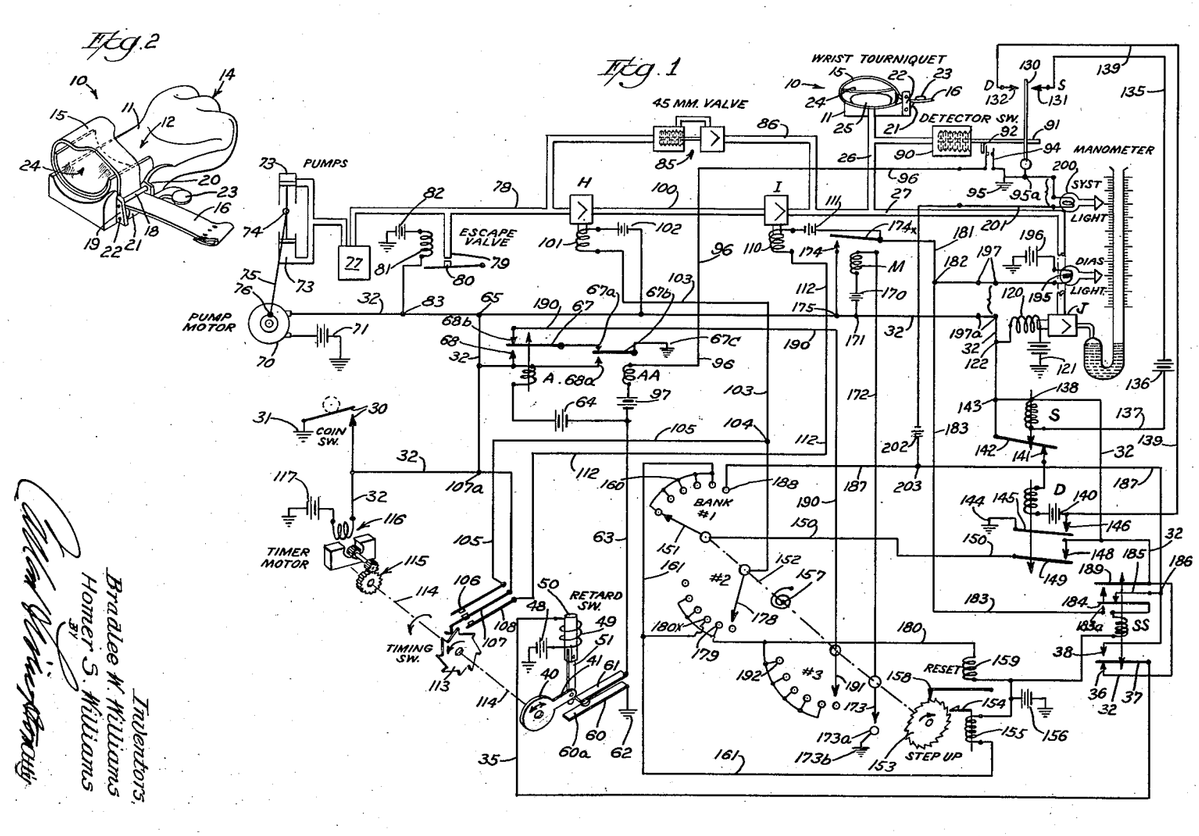
Fig. 1 is a schematic layout of the novel cardiometric apparatus with certain principal instrumentalities shown pictorially.
Fig. 2 is a perspective view of the tourniquet.

In the form of the apparatus shown in Fig. 1, there is employed a novel device for applying the testing or extraneous pressure, the same being in the nature of a tourniquet especially constructed to receive the wrist and hand of the left arm. This device is shown in detail in Fig. 2 and includes a casting 11 of aluminum or other suitable material, providing a trough portion 12 to receive the wrist, and a hand rest 14, with conformations complementary to the partially cupped left hand.

This construction provides a means capable of guiding the hand into proper position, in a manner of speaking, and adapted to induce relaxation and restrain movement while the patron is under test.

A variant form of this device is disclosed in our U. S. Patents Nos. 2,249,370 and Des. 123,-424.

In the improved structure of Fig. 2, a wrist strap 15 is secured in the trough of the casting, and has a tongue 16 guided between jaw means including a stationary roller element 18 disposed between opposite flanges 19 and 20, and a rockable jaw 21 pivoted as at 22 and adapted to be rocked (counterclockwise) by spring means not shown, so as to grab or wedge the tongue to prevent retroactive movement thereof toward the left.

Means for effecting release of the jaw includes a thumb piece 23 to be depressed to rock the jaw away from the tongue (clockwise).

Secured beneath a thin, wear resistant covering or shield of silk 24 (Fig. 1) is an inflatable cushion or bag 25 of rubber or the like (deflated in Fig. 2) having a conduit connection 26 (Fig. 1) with a branch 27 of a fluid pressure system. In the use of the apparatus, the patron's wrist is inserted in the loop of the strap and the tongue is pulled tight and held by the jaw means, whereupon the cushion 25 is inflated, preferably by air.

Introductory statement of operation

Before proceeding with the detailed description, it is pointed out that after the patron has secured his wrist in the tourniquet, he operates a starting switch, preferably by use of a coin, whereupon the tourniquet is inflated by air to a pressure below the average expected diastolic level, at which pressure the tourniquet is shut off automatically from direct connection with the pressure source, and automatic valve means increases the pressure in steps until the first diastolic pulse is detected.

The pulse detecting means includes a sensitive switch of especial design, actuated by pressure variations in the tourniquet. If a succession of diastolic pulses are detected by this means, a signal is given to indicate that the diastolic pressure has been reached, and the test for the systolic pressure goes forward.

The applied pressure continues to be increased in steps until there is an absence of arterial pulsations to be detected, and if no pulses are registered in a predetermined testing period, the application of pressure ceases, whereupon the machine is reset or conditioned for another cycle of operation. Also, a signal is given indicating that the systolic pressure has been reached.

In the circuit diagrams, recourse is had to the method of showing electrical power connections by means of a grounded battery designation, the object being solely to eliminate many return conductors leading to a single power source and thereby simplify the diagrams. It is to be understood therefore that any suitable power source may be used with wiring connections appropriate to the type employed, and further the symbol of the grounded battery is used broadly to indicate electrical power generally without regard to its kind, it being assumed that those skilled in the art will recognize and supply the appropriate power.

Detailed description

Proceeding now with the details of the combination shown in Fig. 1, and assuming that a patron has secured his wrist in the tourniquet, a coin is deposited to operate a conventional coin switch closing its contacts 30 to connect a starting ground 31 to a common or main ground wire 32, which has the immediate effect of energizing the solenoid 49 of a retard switch from its power source or battery 48, via conductor 35 connecting with the common ground wire 32, through normal contacts 36—37 of a relay SS.

As a result, the retard switch pulls up its plunger 50, which lifts a finger 51 from the extended part 60a of the lower one 60 of two contacts 60—61. The lower contact 60 is of the leaf-spring variety and is normally biased so as to engage and close circuit with the upper companion contact 61. However, normally, the weight of plunger 50 and finger 51 on part 60a holds contact 60 away from contact 61 to open the circuit therethrough to ground 62, which circuit extends from the ground through contacts 60—61 when closed, via conductor 63 to battery 64 for a relay A, grounded at 65 to the common return wire or ground 32.

The initial connection of ground 31 by the coin switch therefore energizes solenoid 49 to raise finger 51 and permit contacts 60—61 to close at once and establish one operating ground for batteries 64 and 97 at 62.

As will be explained in detail presently, the plunger and finger 50—51 return to normally lowered position slowly, so that ground circuit 60—61—62—63 remains closed for an interval long enough to permit the relay A to become energized, while coin contacts 30 are closed momentarily as aforesaid, whereupon this relay locks its own holding circuit and connects a holding ground 67c to the common wire 32 at 65 via contacts 67—68 on relay A.

Thus, even though the coin switch is only momentarily closed, relay A has time to pull up and establish a main operating and locking circuit (including the provision of ground for 32 from 67c via connections 68—67—67a—67b—67c) while the retard switch remains closed as aforesaid. Subsequently this main ground for 32 is shifted to contact 68a by action of relay AA, as will appear.

By reason of the establishment of the main holding ground from 67c to wire 32, solenoid 49 of the retard switch continues to be energized, so that the holding ground 62 controlled thereby does not now open and release relay A. This is a master ground connection which controls the shutting off of the machine after the systolic pressure is taken.

Pulling up of relay A energizes a pump motor 70 from battery 71 and common ground 32, whereupon pumps 73 are driven by a linkage 74—75—76, causing compressed air to be delivered to a receiver 77 communicating into a pressure conduit system 78 normally open through an escape valve means 79—80, which closes, however, as soon as relay A pulls up because an operating coil 81 for this valve is energized from battery 82 via a connection 83 with the common ground wire 32, closing member 80 against port 79, whereby the pressure is permitted to build up in the system.

When the air pressure reaches a predetermined low value, which is below the average expected diastolic pressure (about 70 mm. Hg) and preferably equivalent in this instance to about 45 millimeters of mercury, back pressure from a branch conduit 86, which communicates with the wrist tourniquet 10 at 26 to partially inflate the cushion or bag 25 against the volar aspect of the patron's wrist, closes a bellows valve 85, thereby making the branch 27 a closed system, as will more fully appear.

As an incident to the initial increase in pressure in the closed system, a detector switch bellows 90 projects its plunger or rod 91 outwardly (toward the right), causing a plate 92 to bear against a contact 93 and move it into closed circuit engagement with a companion contact 94, grounded at 95, whereby to connect ground 95 via conductor 96 to the coil of a cutout relay AA which becomes energized through its battery 97 connected to conductor 63 grounded by the retard switch. The purpose of this arrangement is to provide a substitute holding or ground circuit which will be cut out automatically if the patron removes his wrist from the tourniquet before the completion of the cycle of operation.

The cutout circuit is such that the contact 67 for relay A is connected to contact 67a on relay AA which in turn is normally in circuit with movable contact 67b providing ground 67c by means of which the initial locking circuit for relay A is established. As soon as the cutout relay AA pulls up, its contact 67b disengages normal contact 67a, thereof, and completes circuit with contact 68a, thereby quickly completing a substitute ground circuit for that initially set up through contacts 67—68 before relay A has time to release, relay AA being adjusted to pull up quickly, and relay A being adjusted to release slowly, for this purpose.

It will be apparent that a sudden change in pressure in the detector bellows 90 as by the removal of the patron's wrist after relay AA has pulled up, will separate contacts 93—94 on the safety switch and drop out the relay AA, thereby breaking the substitute ground circuit, which will in turn cause the retard switch to be released thereby again opening contacts 61 and 60 so that the relay AA cannot again pull up if the wrist is reinserted, unless the relay A is first actuated as by the deposit of another coin.

Relay AA having pulled up, and the retard switch having been actuated, and the low pressure or 45-millimeter valve having been closed as aforesaid, the apparatus is now in condition to go forward with the test for the diastolic pressure.

Situated between branch 78 and branch 27 of the pressure system, and acting as a shunt around the low pressure valve 85, is a short section of conduit 100 constituting a measuring chamber or branch, and adapted to hold a quantity of air which, in the pressure ranges utilized, will effectuate a change in pressure, when admitted to branch 27, of about four millimeters of mercury. Connecting the measuring branch 100 with the pressure branch 78 is an electromagnetic measuring valve H including a coil 101 provided with battery 102 (grounded on wire 32) and connecting via conductor 103, juncture 104 and conductor 105, to a timing switch contact 106.

Another measuring valve I is interposed in the measuring chamber conduit 100 between valve H and branch 27, and is provided with an operating coil 110, having battery 111 grounded either through 173—174, closed, or shunt contacts 183a—184—189 and connected via conductor 112 to a timing switch contact 108, which is the primary operating control for this valve.

The timing switch includes a rotating cam member referred to as a star cam 113, the same being mounted upon a constantly rotating shaft 114 driven through clock work gears 115 by a timer motor 116 energized from grounded battery 117 through a branch connection 32 of the common ground wire, it being apparent that the timer motor begins operation the moment the common ground wire circuit is set up by relay A, and will continue to operate until relay AA drops out at the conclusion of each cycle of operation of the machine. Operation of the coin switch applies ground to wire 32, which causes relay A to pull up and lock through ground 67c; and retard switch 49 also pulls up, applying ground 62 simultaneously for operation of relay AA. If either relay AA or retard switch 49 is released, the main ground 32 is opened and the machine will stop.

Therefore, the star cam 113 rotates constantly, and its teeth intermittently raise a central timer switch contact 107 out of normal engagement with companion contact 108, and into engagement with companion contact 106, the central timer switch contact 107 being of the spring-leaf variety and biased into normal closed-circuit engagement with contact 108; but as the cam 113 rotates constantly the central contact 108 will be intermittently engaged with its companion contacts 106 and 107.

The central timer switch contact 107 connects at juncture 107a with the common ground wire 32 and therefore the measuring valves H and I will, under conditions later described, be alternately opened and closed, thereby admitting the capacity of chamber or conduit 100 into the closed pressure system 27, and its tourniquet bag 25 and associated detector switch bellows 90. This arrangement therefore provides means for increasing the pressure in the tourniquet step by step.

Communicating with the closed branch 27 of the pressure system, is an indicating device in the preferred form of a mercury manometer, pictorially illustrated in Fig. 1, there being a manometer valve J interposed between the manometer and branch 27, and said valve being normally closed. An operating coil 120 having grounded battery 121 connects at 122 with the common ground wire 32 so that as soon as the relay A pulls up, coil 120 is energized and valve J is opened and remains open to permit the mercury column in the manometer to rise and indicate the pressure in the closed system.

Pressure will continue to rise in the tourniquet through operation of the measuring valves until the diastolic level of the patron is reached; and the diastolic arterial pulsations will effect corresponding pressure variations in the tourniquet bag 25 with consequent displacements of the bellows rod 91 for the purpose of operating a detector switch which includes a contact 130 connected to ground 95 and adapted to move back and forth between a systolic contact 131 and a diastolic contact 132—that is, arterial pulses corresponding to a systole will urge rod 91 outwardly (toward the right) and engage contact 130 with contact 131, and conversely a pressure variation corresponding to a diastole will cause contact 130 to be retracted toward the left into engagement with diastolic contact 132.

The detector switch is self-adjusting and itself the subject of a separate application S. N. 404,-304, filed July 28, 1941. Insofar as the detector switch is instrumental in translating the arterial pulses into controlling impulses for testing purposes, it is a very important instrumentality in the combination, and is therefore described in further detail in view of Figs. 6, 7, and 8.

Figure 6:
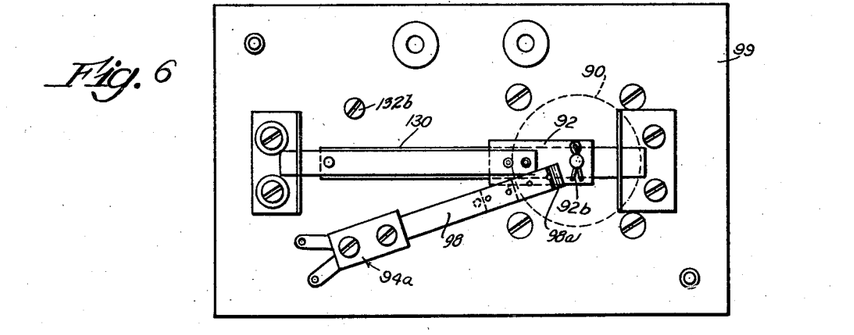
Fig. 6 is an elevational view of the sensitive detector switch.

Referring to Fig. 6, the detector switch is mounted on a panel of insulating material 99, the bellows 90 being secured to one side of the panel and having its operating rod 91 projecting therethrough through loose fitting holes 130a in the contact 130, and through the hole 92a in plate 92 attached as at 92b to contact 131.

The right hand end 130b is offset on the contact 130 and rests loosely in a bracket 130c secured to the panel, which bracket may be considered the fulcrum for the long lever constituting the contact 130. The other contact 131 has its left end 131b loosely fitted in a bracket 131c, said bracket constituting a fulcrum for the long lever contact 131, there being this important difference in the leverages of the two contacts, however, namely, the fact that the leverage in the case of contact 130 is a great deal less than that in the case of the contact 131 so far as displacement by the rod 91 is concerned.

The two contacts 130, 131 rest freely upon the bellows rod 91 in such manner that they are free to move back and forth therewith responsive to the pulsatory movements thereof, the amplitude of movement being greatly multiplied by the short leverage of the contact 130 in comparison with that of the contact 131. The contact 132 is screw-threaded into a cleat 132a (secured to the panel 99 by bolt and nut means 132b) on the panel 99 and disposed to be engaged by the end portion of contact 130 responsive to diastolic pulses, whereas contact 130 engages contact 131 responsive to systolic pulses. As shown in Fig. 6, a cotter pin 92b is passed through bellows rod 91 to limit the movement of contact 131, (and hence contact 130) outwardly, responsive to large displacements of the rod, as upon initial inflation or when movement of the wrist causes large pressure changes in the tourniquet.

The safety switch 93—94 includes a stop 98 with an angled end portion 98a disposed to be engaged by plate 92 upon outward movement thereof to close contact 93 against contact 94 for the purposes heretofore described. The contacts 93 and 94 and stop 98 are secured in a stack of insulating wafers 94a on the panel so as not to obstruct movement of contact 131.

Figure 7:
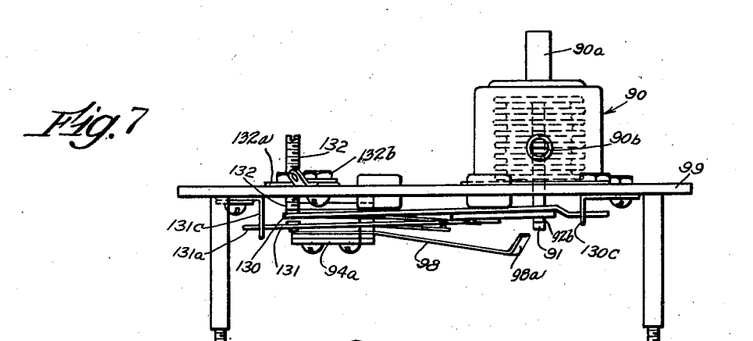
Fig. 7 is a top plan view of the switch of Fig. 6.
Figure 8:
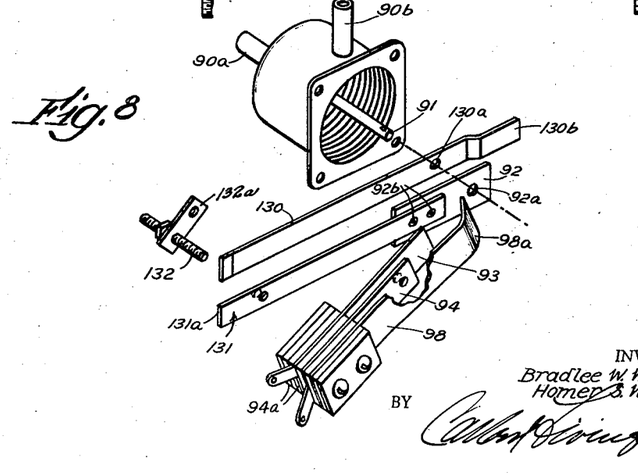
Fig. 8 is an exploded perspective of the principal elements of the device of Figs. 6 and 7.

It may be pointed out that whereas the bellows shown in detail in Figs. 6 to 8 includes inlet and outlet ports 90a and 90b, only one connection is illustrated in Fig. 1. If necessary, either of the ports 90a or 90b could be blocked off and the remaining port connected to the pressure conduit; however, in practice it is more convenient to insert the bellows in a circuit by breaking the conduit and connecting each of the ends to the two ports.

Returning to Fig. 1, it will now be understood that the detector bellows rod 91 is capable of making relatively large displacements and adjustments in position responsive to sudden and large pressure changes in the closed system, and yet it is also capable of imparting minute movements to the lever contact 130.

When arterial pulses are sensed upon reaching the diastolic pressure level, as aforesaid, the detector bellow rod 91 will move back and forth in response to the arterial fluctuation and positive pressure variations in the nature of a systolic pulse will connect ground 95 through contact 130 to systolic contact 131 on the detector switch, thereby completing circuit via conductor 135 to battery 136 and thence via conductor 137 to one terminal of the systolic relay S, having its opposite terminal 138 connected at 143 to the common ground wire 32, so that the systolic relay will be energized. Nothing happens, however, until the systolic pulse ceases, causing the systolic relay contact 142 to fall back, and the following diastolic pulse connects ground 95 via detector switch contacts 130—132 and conductor 139 through battery 140 to one terminal of diastolic relay D, the other terminal of this relay being now connected through normal contact 141 of the systolic relay and contact 142 when systolic contact 142 falls back as aforesaid said contact 142 being connected to the common ground wire 32 at 143, thereby causing the diastolic relay to pull up and connect ground 144 via contacts 145—146 to the conductor 139 so as to provide a locking circuit for the diastolic relay notwithstanding that the initial operating ground for this relay on wire 139 will be broken at 132 as soon as the diastolic pulse ceases.

The next succeeding systolic impulse will actuate the systolic relay, as heretofore described, breaking the ground circuit for the diastolic relay at contacts 141—142 and thereby permitting the diastolic relay to fall back.

Each operation of the diastolic relay D connects common ground 32 (branching at 143) through its contacts 148—149 and conductor 150 to the wiper 151 on bank #1 of a commutator switch, which includes a plurality of such wipers mounted on a shaft 152 for joint rotation by step-up means including a ratchet 153 for the shaft and actuated by a pawl 154 attracted by a step-up coil 155 connected with grounded battery 156. As the shaft 152 steps from the normal position of Fig. 1 in a clockwise direction, it tensions a return spring 157 tending to restore the shaft and wiper to normal or starting position as shown; however, such restorative movement is prevented by a holding pawl 158 engaged in the teeth of ratchet 153, and adapted to be withdrawn from holding position by a reset coil 159 having one of its terminals connected to battery 156.

Wiper 151 may engage any of the first five connected or looped contacts 160 in bank #1, said contacts being connected by conductor 161 to the step up coil 155 to energize the latter from power 156 whenever wiper 151 is connected to ground through contacts 148—149 on the diastolic relay. Upon actuation of the diastolic relay D by a pulse detected as aforesaid, ground will be connected through first position on bank #1 to actuate the step up coil 155 thereby moving all wipers to second position. If a second pulse succeeds the first, the commutator switch will again be stepped to dispose the wiper on third position. At this juncture it is pointed out that the speed of rotation of timer shaft 114 and the spacing of the teeth on the star cam 113, are such that there is time for two complete systolic and diastolic pulses to occur between successive operations of the timer switch means 106—107—108, so that it is possible for operation of the measuring valves H and I to occur in the interim between successive movements of the commutator switch, and conversely it is possible for a plurality of pulses to be detected to actuate the commutator switch between operations of the timer switch as aforesaid.

Means are provided, however, for preventing the operation of the measuring valve I after the commutator switch has stepped once from first position, this means including a measuring valve relay M having one terminal connected to a battery 170 which is grounded to the common wire 32 at 171, while the other terminal is connected via a conductor 172 through a special wiper 173 and a normal or first-position contact 173a on the commutator switch to ground 173b. Battery 111 for valve I is connected to contact 174 on relay M, which contact is engaged with contact 174 when relay M is energized, whereby to connect one ground for battery 111 at juncture 175 with the common wire 32.

The measuring valve coil 110 is energized, however, only when the commutator switch is in first or sixth and last position. In first position the wiper 173 engages contact 173a connected to ground 173b, which completes the circuit for relay M. As soon as the commutator switch leaves the first position, wiper 173 disengages contact 173a and breaks this energizing circuit thereby opening the ground circuit at 174—174x and disabling the coil 110 for valve I. Under conditions later described there is a substitute ground connection set up for coil 110 by relay SS at a later time.

The foregoing arrangement prevents any increase in the applied pressure during a testing interval in which additional pulses may actuate the step-up coil via any of the succeeding contacts on bank #1 after first position.

Assuming the case where no additional pulses are detected at second position, the commutator switch will be reset by the timing switch in connecting ground at juncture 104 to wiper 178 on bank #2, which in turn energizes the reset coil 159 via contact 179 and conductor 180, thus withdrawing the holding pawl 158 and permitting spring 157 to rotate the commutator shaft to starting position, whereupon valve I will be operable by restoration of its circuit through special contact 173—173a. Accordingly, a further increase in pressure may be effected by operation of valves H and I and further pulses may be detected and caused to advance the commutator switch through bank #1 as heretofore described.

Assuming that the commutator switch is thus advanced to third position and no further pulses are detected, the step-up coil will again become energized, this time via wiper 178 and third contact 180x through conductor 161 to the step-up coil, thus carrying the wiper to fourth position. If, however, no further pulses are detected, the switch will reset through an impulse from the timing switch via wiper 178 to the fourth contact on bank #2 and thence via conductor 180 to the reset coil 159.

In the event, however, that a succession of pulses occur, the commutator switch will be successively stepped to the sixth and last position, it being recalled that between the second and fifth position, the measuring valve I is disabled.

Upon reaching sixth position, the measuring valve will again be connected in circuit by a shunt ground or jumper 181 connecting at juncture 182 to conductor 183 which leads to terminal 183a of the systolic testing relay SS and thence via its make contacts 184—189 to a juncture 186 with a conductor 187 leading to the sixth contact 188 on bank #1, provided that the relay SS has not been energized.

Operation of the diastolic relay D by a detected pulse with wiper 151 on contact 188 in last position will connect ground 32 via contacts 148—149, conductor 150, conductor 187 to normal contact 185 on relay SS thereby connecting ground to the coil of relay SS through engagement of contact 185 with contact 184; this causes relay SS to pull up at once, and the aforesaid ground connection to be immediately transferred, without opening, from contacts 184—185 to contacts 184—189, contacts 184, 185 and 189 being of the make-before-break variety so that relay SS is now locked from common ground 32 and contacts 184—189, which ground is also applied to conductor 183, thereby conditioning battery 111 via jumper 181 for subsequent operation of valve I under control of the timing switch contacts 107—108 in ascertaining the systolic pressure.

As soon as relay SS pulls up, the holding circuit for the retard switch is broken at the contacts 36—37, but an operating circuit for the retard switch is at once reestablished via contacts 37—38, juncture 186, conductor 187 through contacts 188—151 on bank #1 and thence via conductor 150 through the diastolic relay contacts 149—148 to 32. Thus upon subsequent actuation of the diastolic relay D, as by continuing pulses at or above the previously ascertained diastolic pressure level, the coil 49 of the retard switch will be energized once for each pulsation detected—such pulsation meaning complete pulsation, systolic and diastolic.

Therefore, so long as pulses continue to be detected, the retard switch will be repeatedly energized and prevented from returning to normal position. In the meantime the timing switch continues to operate valves H and I so that the pressure is increased step by step in the tourniquet until the systolic pressure level is reached and blood flow substantially occluded to prevent further pulsations in the artery with a consequent lack of energization of the sensing relays S and D. Since no further pulses are detected, the retard switch finger 51 is restored to normal position to open switch contacts 60—61 thereby breaking the ground circuit for relay AA and breaking the main ground circuit connection for the common or ground wire 32 at contacts 68a—67b, whereupon all circuits are restored to normal. In particular, the commutator switch is restored to starting position by re-engagement of contacts 67a—67b in connecting ground 67c to contact 67 and thence to normal contact 68b, via conductor 190 to wiper 191 on bank #3, which wiper is at this time resting on the last contact 192 of the group of contacts connected together from positions 2 to 6 thereon, whereby said ground is connected to conductor 180 to the reset coil energizing the latter and effecting restoration of the commutator switch in the manner heretofore described.

In order to provide a signal to indicate when the diastolic pressure reading is to be taken on the manometer, there is provided a diastolic light 195 energized from battery 196 and a conductor connecting at terminals 197 to juncture 182 with the holding ground conductor 183 from relay SS when the latter pulls up upon arrival at the diastolic level, which causes energization of the diastolic light, it being intended that suitable instructions or indica be associated with that light advising the patron of the purpose thereof, since the mercury column will shortly continue to rise in the ascertainment of the systolic pressure. Lamp 195 will be illuminated from its battery 196 whenever, or so long as, conductor 183 is grounded by relays M or SS. As explained hereinafter, light 195 flashes until the diastolic pressure is reached.

Means is also provided for giving a signal when the systolic reading is to be taken before the machine finally shuts off, said means including a systolic signal light 200 having one terminal connected at 95a to the ground 95 on the safety switch, and the remaining terminal connected via a conductor 201 to battery 202 grounded at 203 to the conductor 187 from last contact 188 on bank #1 (which ground impulses the retard switch until no further arterial pulsations are detected, just prior to the time the machine shuts off). This ground on contact 188 is derived from wiper 151 in last position, wire 150, contacts 149, 148 on relay SS, operated, to ground wire 32. In the interval between the time the light 200 will start to flash by impulses delivered to conductor 187, and the time the retard switch restores to normal position to break all circuits, the patron is apprised of the approach of the reading to the systolic level. When lamp 200 goes out the systolic pressure has been reached.

Figure 3:
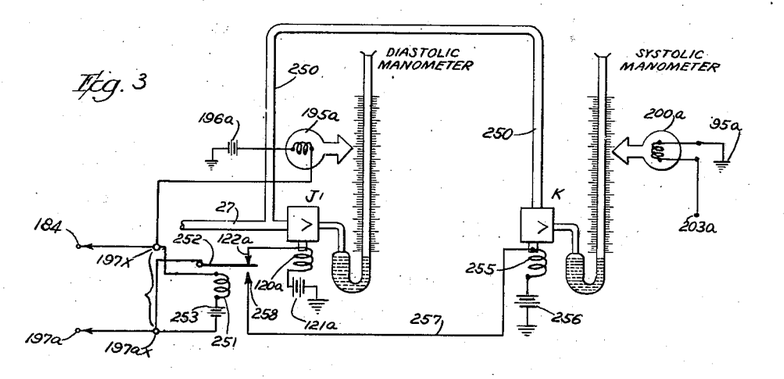
Fig. 3 is a schematic view of a modified manometer or indicating arrangement for optional substitution in the arrangement of Fig. 1.

If desired, separate indicators or manometers may be used for the diastolic and systolic readings, a substitute arrangement being shown in Fig. 3 herein and including a diastolic manometer provided with a valve J′ identical to the valve J of Fig. 1; and a systolic manometer provided with a valve K connecting via a by-pass conduit 250 to the conduit portion 27 ahead of its connection with valve J′.

As in the case of the diastolic manometer a light 195a has one terminal connected to grounded battery 196a, while the remaining terminal connects with the terminal 197x, and one side of a relay coil 251, energized from battery 253 grounded to the common wire 32 through 197a—197ax.

Valve J′ in the modification is actuated by a coil 120a energized from grounded battery 121a and having its other terminal connected to contact 122a on relay 251, the normal contact 252 of which relay connects to terminal 197ax.

The systolic manometer valve K is actuated by a coil 255 having one terminal connected to grounded battery 256 and the other terminal connected via conductor 257 to a make contact 258 on relay 251.

The foregoing substitute indicating arrangement is adapted to be connected to the terminals 184 and 197a in Fig. 1, terminal 197x connecting with terminal 184 of Fig. 1, while terminal 197ax connects with terminal 197a of Fig. 1, as indicated to the left of the bracket, at terminals 197x—197ax. For this purpose the manometer J is disconnected from the right of the bracket at terminals 197—197a in Fig. 1; the former connection at 197 being left open and the manometer and valve arrangement there shown being replaced by the substitute valve J′ and its diastolic and systolic manometer system, including valve K.

In the operation of the modified structure, valve J′ will open at the beginning of operation of the machine as in the case of the valve J of Fig. 1, because the common ground 32 is then available at 197a—197ax, and the diastolic manometer of Fig. 2 will function in the same manner as the manometer of Fig. 1, except that light 195a does not burn or flash until such time as the diastolic pressure level is reached, and sufficient pulses are detected to advance the commutator switch to last position, whereupon the valve J′ will close to hold its reading as follows:

As soon as ground 32 is connected via contacts 184—189 of relay SS, upon energization of the latter, and thence to conductor 183, light 195a will go on and the manometer transfer relay 251 will be energized from this ground on 197a—197x to break contacts 122a—252 thereon to cause closure of valve J′ as stated, whereupon coil 255 for valve K will be energized through contacts 252—258 on the transfer relay and conductor 257 to hold valve K open until the machine is ready to shut off.

A signal in the nature of light 200a is provided adjacent the systolic manometer, and has one terminal grounded at 95a, while the remaining terminal connects at 203a, through battery 202, with the terminal 203 of Fig. 1. Thus when the impulse circuit for the retard switch is sent up on the last contact of bank #1 to conductor 187 and relay SS pulls up, closing contacts 183a—184—189, light 200a will flash until the systolic pressure level is reached at which time it goes out since arterial pulses are no longer detected and the retard switch ceases to hold up preparatory to finally shutting off the machine by opening the holding ground 62 at 60—61.

Figure 4:
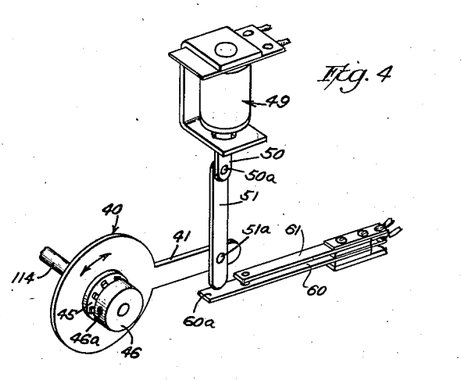
Fig. 4 is a perspective view of a novel slow-acting or timing-switch.
Figure 5:
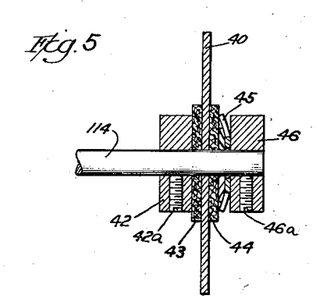
Fig. 5 is a sectional detail of a slip-clutch mechanism.

In Figs. 4 and 5 there are shown details of the retard switch structure heretofore described in view of Fig. 1, it being further pointed out here that the retarding member 40 is mounted on the timer shaft 114 through a slip-clutch arrangement which consists preferably of a fixed collar 42 on shaft 114, secured by its set screw 42a, and a frictional washer of felt or the like indicated at 43, between the collar 42 and the member 40, there being an additional frictional washer 44 of felt or the like on the opposite side of member 40 with a spring washer or spider 45 interposed between washer 44 and another fixed collar 46 which may be adjustably positioned on shaft 114 by use of its set screw 46a so that various degrees of tensioning of spring washer 45 may be procured with consequent frictional engagement of greater or less degree between the member 40 and the associated assembly of washers.

The retard member 40 is provided with a radial arm 41 which is pivotally connected at 51a with the finger 51, this finger in turn being pivotally connected as at 50a with the lower end of the solenoid plunger 50.

Normally the weight of plunger 50 urges finger 51 downwardly with its nose bearing against extension 60a on the switch to spring contact 60 out of closed circuit engagement with contact 61, By virtue of the fact that shaft 114 is being constantly rotated throughout the cycle of operation of the apparatus, there is the tendency to rotate the member 40 in an anti-clockwise direction; however the weight of the plunger and finger is sufficient to overcome this tendency, owing to the slip-clutch assembly 42—43—44, etc., and switch 60—61 therefore remains open.

However, when solenoid 49 is energized to raise plunger 50 and open the switch, the turning effort of shaft 114 through the slip-clutch slows up the return movement of the plunger and finger thus providing a lapse of time in which the switch remains closed longer than if the retarding means 40, etc., were not employed. In fact, the speed of return of the plunger assembly may be regulated by adjusting the tension of the spring washer 45, it being apparent that the resiliency of the washers 43—44 also contributes to this adjustment in so far as relatively hard or soft washers may be employed in effecting an adjustment of speed. So far as is known this retard switch structure is entirely novel and is claimed as a feature of the invention.

*Summary of operation*

Having placed his wrist in the tourniquet, the patron deposits a coin to close the coin switch contacts 30, thereby simultaneously energizing the retard switch 49 and relay A which sets up a temporary ground circuit 32—68—67—67c for the entire machine and starts the pump motor and timer motor with the result that air is delivered into the pressure system as soon as the escape valve 80 closes upon setting up of the common ground 32 aforesaid.

As soon as a sufficient pressure is arrived at to close the valve 85, the detector switch bellows 90 closes safety switch contacts 93—94 to energize the secondary holding relay AA which pulls up to transfer the main holding ground to contacts 67b—68a of relay AA, relay A also being held up. Meanwhile the retard switch has been energized through normal contacts 36—37 on relay SS and the main ground switch 60—61 is permitted to close to complete the holding circuit for relay AA when relay A first becomes energized as stated above.

As soon as the common ground is effectuated, manometer valve J opens through energization of its coil 120 from juncture 122. The timing switch is operated by the constantly rotating timer shaft 114 and alternately closes contacts 106—107, and 107—108, thereby alternately energizing the coils 101 and 110, respectively, of the measuring valves H and I, so that the measured capacity of the conduit portion 100 is intermittently delivered to the closed branch 27 to further inflate the bag 25 of the tourniquet, such pressure increment being continued until the diastolic pressure of the patron is reached as indicated by the actuation of bellows 90 to reciprocate rod 91 responsive to arterial pulses sensed by the tourniquet.

Operation of the detector bellows 90 oscillates the contact 130 of the detector switch thereby alternately connecting ground 95 to the systolic contact 131 and the diastolic contact 132. Ground from the systolic contact energizes relay S which has as its principal function the breaking of the holding circuit at contacts 141—142 for the diastolic relay D. Ground from diastolic contact 132 energizes the coil of the diastolic relay and causes the latter to lock its own circuit at contacts 145—146.

Each time the diastolic relay is energized under control of detected pulses, ground from the common wire 32 is connected via contacts 148—149, conductor 150, to wiper 151 on bank #1 of the commutator switch, which impulses step-up coil 155 correspondingly. If five successive pulses are detected, wiper 151 will lodge upon the last contact 188 of the bank and energize relay SS to set up circuits for the ascertainment of the systolic pressure.

As soon as the commutator switch leaves first position, the special wiper 173 will disengage contact 173a thereby disabling the coil 110 for measuring valve I at relay M, causing the latter to be de-energized and opening of its contacts 174—174x removing ground from battery 111 and causing lamp 195 to flash upon advance and resetting of the commutator switch, which actuates relay M. This operating circuit for valve I will be restored, however, when the commutator reaches the last position. If two successive pulses are detected, the commutator wiper 178 will lodge on contact 180x, bank #2, and if no further pulses are received at this time, the commutator switch will automatically advance one step by closure of timing switch contacts 106—107 connecting ground through said contact 180x to energize step-up coil 155 for the commutator switch, causing the latter to step to fourth position. If no pulses are received in fourth position after automatic advancement of the commutator switch as aforesaid, the switch will be reset by operation of the timing switch, as before, connecting ground through wiper 178 to any of the second, fourth, or fifth contacts of bank #2 via conductor 180 to the reset coil.

Upon each resetting of the commutator switch to normal position, except when the machine shuts off, valve I is again conditioned at contacts 173—173a for operation to increase the pressure in the tourniquet system, until sufficient pulses are detected to advance the commutator switch to last position and energize the relay SS as heretofore mentioned. The relay SS breaks the holding circuit for the retard switch at contacts 36—37 and via contacts 37—38 establishes an impulsing circuit for the retard switch via conductor 187 to contact 188 bank #1. Thus each ground impulse from contacts 148—149 of relay D will impulse the retard switch and assist in maintaining the switch 60—61 open owing to the slow action of the retard means. The return action of the retard switch is adequately slow to permit several complete pulses, i. e. arterial pulses, to occur before restoration to normal position.

If no pulses occur after continued operation of valves H and I following operation of relay SS, then the main ground circuit to 62 will be broken by the retard switch at contacts 60—61, thereby releasing relay AA, which opens ground 67c, shutting off the entire machine.

It may be observed that the diastolic signal light will flash intermittently with operations of relay M, and later stops flashing and glows steadily when the commutator switch moves into last position by virtue of connection of ground 32 to conductor 183 at 184—189 when relay SS pulls up upon the last testing step, bank #1.

The systolic signal light comes on intermittently, after the commutator switch takes the last testing step, until the systolic level is reached, by virtue of closure of contacts 148—149 on the diastolic relay intermittently connecting ground to juncture 203 for the battery 202 of the systolic light. When the systolic pressure is approached light 200 goes out.

In the substitute manometer arrangement of Fig. 3, the diastolic light glows steadily after the diastolic level is reached, and the systolic light 200a flashes until the machine shuts off, the systolic pressure reading, of course, being taken when the mercury column in manometer K finally stops rising. The readings are properly taken when both lights go out, because both valves J' and K close to hold such readings. In the arrangement of Fig. 1, the diastolic reading must be taken as soon as lamp 195 burns steadily, while the systolic reading may be taken when lamp 200 goes out, or thereafter.

The foregoing description and illustrations are submitted as merely exemplary of one preferred arrangement and form of the invention, and means for effectuating the objects set forth; but it is expressly to be understood that no particular mode of connection or inter-connection of the various circuits is intended, except insofar as the appended claims may be specific thereto, it being understood further that modifications in such connections and in the form and mode of operation of the instrumentalities named, may be made without departing from the scope of the invention, and no limitations are intended except as specifically contemplated by the following claims:

We claim:

1. Apparatus for ascertaining the diastolic and systolic blood pressure and comprising, in combination with an inflatable tourniquet and means for delivering an inflating pressure thereto, the following instrumentalities, namely: means for increasing said inflating pressure by increments of substantially fixed measure from a sub-diastolic level, means for detecting arterial pulses, means for indicating the pressure in said tourniquet, means controlled by said detecting means if a group of several test pulsations occurring in succession are detected for signalling that the diastolic pressure level has been reached, means for causing said inflating pressure to continue to increase thereafter, and means actuated under control of said detecting means in the absence of detected pulses in a measured time interval for arresting delivery of inflating pressure to the tourniquet.

2. The combination defined in claim 1 and further characterized by the provision therein of means for indicating arrival of the pressure, by said indicating means, to the systolic level.

3. Apparatus of the class described comprising in combination, a wrist tourniquet inflatable by fluid pressure, means for inflating the tourniquet until diastolic arterial pulses can cause pressure variations therein, means for exhibiting the degree of pressure in said tourniquet, signal means for announcing indication of the diastolic pressure by said exhibiting means, testing means co-operable with said tourniquet and actuated by a plurality of test pressure variations therein to effect operation of said signal means if said plurality of pulses has been detected as aforesaid, inflation as aforesaid being continued thereafter, until there are no pulses to actuate said testing means, and means operated automatically in the absence of pulses to actuate the testing means as aforesaid to disable the inflating means whereby the pressure indicated at that time by the exhibiting means may be utilized as a measure of the systolic pressure.

4. In a blood pressure ascertaining mechanism, in combination, a tourniquet inflatable to apply pressure to an artery, a source of inflating pressure, a manometer connected to indicate pressure in said tourniquet, valve means operable normally to close the manometer from pressure in said tourniquet, means for intermittently increasing pressure in said tourniquet from said source, means for opening said valve means during pressure increase as aforesaid, sensing means including a pressure-responsive detecting device cooperable with said tourniquet for actuation by arterial pulsations, means under control of said sensing means following detection thereby of a certain number of diastolic pulses for giving a signal to indicate that the diastolic pressure is being indicated by said manometer, said intermittent pressure increase continuing, and a timing device cooperable with said sensing means for stopping said increase if no pulses are detected in a certain interval, the pressure indicated by the manometer at the time of stoppage as aforesaid being a measure of the systolic pressure.

5. The combination set forth in claim 4 further characterized by the provision of signal means to indicate approach to the systolic pressure indicating level, and means to automatically condition said last-mentioned signal means for operation following operation of said first-mentioned signal means.

6. The combination of claim 4 further characterized by the addition of signal means to indicate approach to the systolic level, and means to automatically condition said last-mentioned signal means for operation under control of said sensing means so long as pulses continue to be detected after operation of said first-mentioned signal means.

7. The combination of claim 4 further characterized by the addition of signal means to indicate the systolic pressure, and means to automatically condition said signal means for operation under control of said sensing means upon cessation of the effective detection of pulses by said sensing means.

8. Apparatus of the class described comprising the combination, with means for applying a testing pressure to an artery and means for detecting arterial pulses, of improved means for ascertaining the diastolic and systolic blood pressure by a progressive increase in the applied pressure, said means comprising: separate indicators for indicating the amount of pressure applied by said applying means, means for causing gradual increase in the pressure applied as aforesaid from a sub-diastolic level toward systolic level, means operable to disable said indicators individually from changing indication, testing means operated under control of said detecting means to actuate the disabling means for one of said indicators as soon as a predetermined number of pulses are detected in advancing toward the diastolic level, and means including a slow-acting device set into operation following detection of said predetermined number of pulses and thereafter maintained in effective condition so long as pulses continue to be detected, but becoming ineffective if pulses are not detected in a certain time interval to actuate the disabling means for the remaining indicator to indicate the systolic pressure.

9. In a testing system for apparatus to ascertain diastolic and systolic blood pressure by a progressive increase of extraneous pressure on an artery, and means for detecting pulses in said artery, that improvement which comprises: the provision of testing means including an advanceable device, means under control of said detecting means for effecting advance of said device a certain amount for each pulse detected, means actuated to effect indication of the amount of extraneous pressure at a time when said advanceable device has been advanced a determined number of times, a time-limit device started in effect under control of said advanceable device upon advance said determined amount and restarted under control of said detecting means by each subsequently detected pulse to prolong said time limit, and said limit device operating after lapse of time if not restarted as aforesaid to actuate means for effecting further indication of the amount of extraneous pressure at the expiration of said time limit.

10. Apparatus of the class described including, in combination: Means for applying compression to an artery, means for regulating an increase in the degree of compression in measured quantities from sub-diastolic to systolic levels, said applying means being sensitive to arterial pulsations at least between and at said levels, electrical control means cooperable with said compression means and actuated by sensed pulsations, counting means under control of said control means for counting sensed pulses, means for automatically resetting said counting means when it has counted less than a certain number of pulses in a predetermined time, means for disabling said regulating means while said counting means is between reset position and a position corresponding to said predetermined number of pulses, means under control of said counting means for signalling the counting of a certain number of pulses at the diastolic level, and means for signalling when less than a certain number of pulses are sensed following increase of pressure above said diastolic level.

11. In apparatus of the class described, the combination with a blood pressure tourniquet and means for inflating same automatically, of a switch actuated by arterial pulse reactions in said tourniquet, electrical means for counting pulses and controlled by said switch, means controlled by said counting means for giving a signal when a certain number of pulses at the diastolic pressure level is counted and for giving another signal if a certain number of pulses at the systolic pressure level is not sensed in a measured time interval thereafter.

12. In a blood pressure machine, means for sensing arterial pulsations, means cooperating with said sensing means for applying and increasing a pressure to an artery under test from a sub-diastolic level, at least, to above a systolic level, means cooperating with said sensing means for counting arterial pulses, means controlled by said counting means for automatically giving a signal when a series of pulses is counted at the diastolic pressure level, and for automatically giving another signal when said pressure is increased to above a systolic level and a certain time interval has elapsed and no pulses have been sensed in said interval.

13. In a blood pressure machine, means for sensing arterial pulsations, means cooperating with said sensing means for automatically applying an increasing pressure to an artery under test from a sub-diastolic level upwards to above a systolic level, means cooperating with said sensing means for counting complete arterial pulses each consisting of a systolic pulsation and an accompanying diastolic pulsation, means for automatically giving a signal when several complete pulses in succession are sensed at the diastolic level, and for automatically giving another signal when no complete pulsations are sensed above said diastolic level following increase of pressure upwards toward the systolic level as aforesaid.

14. In a blood pressure machine, means for sensing pulsations in an artery under test, means for applying measured increases in pressure to said artery, means for counting pulsations in said artery, a time delay device, means for giving a signal when a certain number of systolic pulsations and a certain number of diastolic pulsations have been counted at approximately the diastolic pressure level, and means for giving another signal when no systolic pulses and no diastolic pulses have been sensed at approximately the systolic level in a time interval of predetermined limits, one of which is operably determined by said counting means, and the other of which is operably determined by said time delay device.

15. In a blood pressure machine, means for applying measured increments of pressure to an artery under test, means for sensing pulses in said artery, means for counting said pulses, means for illuminating a signal lamp when a series of pulses are counted at approximately the diastolic pressure level, and means for actuating a signal lamp when said pressure rises above the diastolic level provided less than a certain number of pulses are sensed in a predetermined time interval.

16. In a blood pressure machine, means for applying measured increments of pressure to an artery under test, means for sensing pulses in said artery, means for timing the interval between said increments, means for counting pulses occurring in said intervals, means for giving a signal when a series of several consecutive pulses has been counted at the diastolic level, means for arresting pressure increase if fewer than a given number of pulses are counted in a measured time interval, and means for giving another signal if further pulses are not sensed in a certain time interval following said last-mentioned interval.

17. In a blood pressure machine, means for applying pressure to an artery under test, means for increasing said pressure in fixed amounts, means for timing the interval between increases of pressure, means for counting arterial pulses, a first indicator and means under control of said counting means for actuating the same to give an indication upon counting a certain succession of systolic and accompanying diastolic pulses at the diastolic pressure level, a second timer controlled by said sensing means, a second indicator cooperably controlled by said counting means and said second timer to give an indication when a pressure level is reached where less than a predetermined number of pulses are sensed in a certain interval of time following actuation of said first indicator whereby to signify the reaching of a pressure at the systolic level.

18. In a blood pressure machine in combination, means for applying pressure to an artery under test, means for sensing pulses in said artery, a diastolic pressure gauge, a systolic pressure gauge, pulse counting means, means for increasing the applied pressure in measured amounts, a timer, and means functionally associating the aforesaid parts for automatic cooperation to increase the applied pressure from a sub-diastolic to a diastolic level, indicated by said diastolic gauge, and thereafter to automatically increase the applied pressure to a systolic level indicated by said systolic gauge, and to verify said indications by the counting of a certain succession of pulses at the diastolic level, and by the absence of pulses in a certain period of time at the systolic level.

19. In a blood pressure machine, in combination, means for sensing pulses in an artery, means for applying and regulating pressure by measured amounts to said artery, a pressure gauge for said applying means, and means including time and step-operated switch means cooperable with said applying and sensing means for counting a certain number of systolic and attendant diastolic pulses sensed when said applied pressure is of a value approximating the diastolic tension in said artery, and for giving a signal to announce the indication of the diastolic pressure by said gauge, and to give a further signal when no pulses are counted in a period of time sufficient for at least two complete systolic and attendant diastolic pulses when said pressure is regulated to approximately the value of the systolic tension in said artery.

20. In a blood pressure machine, including pulse-sensing means and pulse-controlled means for varying an applied testing pressure in a succession of amounts at timed intervals, the combination of: a resettable stepping device and means for stepping the same from a starting position under control of said sensing means, means for automatically resetting said device to starting position at certain time intervals when it has been advanced to any of several certain positions, means under control of said sensing means for preventing resetting from said certain positions if a pulsation is sensed between successive ones of the last-mentioned certain time intervals, and for advancing said stepping device, means for exhibiting the degree of applied pressure, means actuated by said stepping device when advanced a predetermined number of steps beyond a last one of said certain positions to prevent said exhibiting means from changing indication, a timer started in operation by said stepping device upon taking said predetermined number of steps beyond the last of said certain positions, and means for exhibiting the degree of applied pressure when fewer than a given number of pulses are sensed in an interval lapsing after start of said timer.

21. In a blood pressure machine, verifying means including a stepping switch adapted to be advanced from a starting position under control of arterial pulses, a first timer switch connected to reset said stepping switch from certain selected positions of advance thereof if it is not advanced from said positions by pulses occurring in an interval limited by said timer switch, means actuated by said stepping switch as a result of advance thereof beyond a last one of said selected positions, a second timer switch started in operation by said stepping switch advanced beyond the last selected position aforesaid, means for restarting said second timer switch under control of arterial pulses, and means actuated by said second timer switch if the same is not restarted in a certain time interval.

BRADLEE W. WILLIAMS.
HOMER S. WILLIAMS.